(12) United States Patent
Greenlee

(10) Patent No.: US 10,199,022 B1
(45) Date of Patent: Feb. 5, 2019

(54) TOUCHLESS SIGNAL MODIFIER AND METHOD OF USE

(71) Applicant: Jonathan Greenlee, Saint Paul, MN (US)

(72) Inventor: Jonathan Greenlee, Saint Paul, MN (US)

( * ) Notice: Subject to any disclaimer, the term of this patent is extended or adjusted under 35 U.S.C. 154(b) by 0 days.

(21) Appl. No.: 15/885,474

(22) Filed: Jan. 31, 2018

Related U.S. Application Data

(60) Provisional application No. 62/453,497, filed on Feb. 1, 2017.

(51) Int. Cl.

| | |
|---|---|
| *G10H 1/00* | (2006.01) |
| *G10H 5/00* | (2006.01) |
| *G10H 5/02* | (2006.01) |
| *G10H 1/18* | (2006.01) |
| *G06F 3/01* | (2006.01) |
| *G10H 1/34* | (2006.01) |

(52) U.S. Cl.
CPC ........... *G10H 1/0066* (2013.01); *G06F 3/017* (2013.01); *G10H 1/18* (2013.01); *G10H 1/348* (2013.01); *G10H 5/02* (2013.01); *G10H 2220/415* (2013.01)

(58) Field of Classification Search
CPC .............. G10H 1/00; G10H 2240/211; G10H 2210/155; G10F 1/16; A63B 2225/50; A63B 71/0622
See application file for complete search history.

(56) References Cited

U.S. PATENT DOCUMENTS

| | | | | |
|---|---|---|---|---|
| 1,661,058 | A | 2/1928 | Theremin | |
| 5,834,671 | A * | 11/1998 | Phoenix | G10H 1/0066 84/645 |
| 6,492,775 | B2 * | 12/2002 | Klotz | G10H 1/00 250/221 |
| 8,121,300 | B1 * | 2/2012 | LoDuca | G10H 1/22 381/118 |
| 8,872,014 | B2 | 10/2014 | Sandler | |
| 2004/0144241 | A1 * | 7/2004 | Juskiewicz | G10H 1/0058 84/723 |
| 2004/0168566 | A1 * | 9/2004 | Juszkiewicz | G10H 1/0058 84/723 |
| 2006/0196343 | A1 * | 9/2006 | Yung | G09B 15/00 84/470 R |
| 2007/0234880 | A1 * | 10/2007 | Adams | G10H 1/0066 84/601 |
| 2007/0234889 | A1 * | 10/2007 | Rotolo de Moraes | G10H 1/361 84/730 |
| 2008/0141847 | A1 * | 6/2008 | Komatsu | G10H 1/346 84/440 |
| 2008/0184872 | A1 * | 8/2008 | Hunt | G10H 1/0075 84/645 |

(Continued)

OTHER PUBLICATIONS

Fairchild Semiconductor Application Note 118 Oct. 1974 https://web.archive.org/web/20170209183114/https://www.fairchildsemi.com/application-notes/AN/AN-118.pdf.

(Continued)

*Primary Examiner* — Marlon Fletcher

(57) ABSTRACT

A signal processing system, machine, and method of use to dynamically vary the power supplied to a signal processing circuit, imparting the processed output signal of the signal processing circuit with alterations substantially beyond the alterations typically produced by the signal processing circuit.

18 Claims, 18 Drawing Sheets

(56) References Cited

U.S. PATENT DOCUMENTS

| | | | | |
|---|---|---|---|---|
| 2010/0175543 A1* | 7/2010 | Robertson | ............... | G10H 3/186 84/735 |
| 2010/0180756 A1* | 7/2010 | Fliegler | ............... | G10H 1/0066 84/723 |
| 2010/0254676 A1* | 10/2010 | Ebato | ............... | G11B 27/034 386/248 |
| 2013/0233156 A1* | 9/2013 | Kapp | ............... | G10H 1/0091 84/626 |
| 2014/0006830 A1* | 1/2014 | Kamhi | ............... | G06F 1/3287 713/324 |
| 2014/0033900 A1* | 2/2014 | Chapman | ............... | G10H 1/0083 84/609 |
| 2014/0144308 A1* | 5/2014 | Holm | ............... | G10D 3/163 84/322 |
| 2016/0162002 A1* | 6/2016 | Liang | ............... | G06F 1/3206 713/323 |
| 2017/0090640 A1 | 3/2017 | Roberts | | |
| 2017/0192465 A1* | 7/2017 | Lazaridis | ............... | G06F 1/1662 |
| 2018/0188850 A1* | 7/2018 | Heath | ............... | G06F 3/044 |

OTHER PUBLICATIONS

Paul Stoffregen Teensy 3.2 schematic Original publish date unknown https://web.archive.org/web/20170806054719/https://www.pjrc.com/teensy/schematic.html.

Harrison Instruments, INC Minimum Theremin Kit Schematic Original publish date approximately 2006 https://web.archive.org/web/20170413021803/http://harrisoninstruments.com/100/100_schematic.html.

* cited by examiner

TOUCHLESS SIGNAL MODIFIER AND METHOD OF USE

RELATED APPLICATIONS

Priority claim 62/453,497 filed Feb. 1, 2017 included by reference.

BACKGROUND—PRIOR ART

Signals, such as audio and video, are an essential component of the creative process in many industries, such as film, video game development, and performing arts. Professionals and hobbyists in these disciplines are always looking for new tools and methods to manipulate signals. Today, many different signal processing circuits and manipulation techniques are in use for the purpose of creative expression.

For example, audio processing circuits are common in studio and live performance applications. Many are marketed as effects pedals, or simply guitar pedals, even though they are also widely used by keyboard players, singers, and other instrumentalists. Guitar pedals, such as the fuzz pedal or the wah pedal, demonstrate the pleasing results of deliberate distortion or alteration of an audio signal. Such pedals are good tools to demonstrate how modification or degradation of a signal can cause creative and desirable results.

A requirement of effects pedals and many other signal processing circuits is the need for electrical power. Several solutions for this requirement are in place today, such as batteries, and A/C power adapters.

SUMMARY OF THE INVENTION

In accordance with the disclosure a touchless signal modifier and a method of use. Nearly all such power supplies used by signal processing circuits are not controllable by the user. Furthermore, it is generally the case that a power supply commercially provided with a given signal processing circuit will provide sufficient power to keep the signal processing circuit operating at continuous peak performance without requiring additional configuration from the end user.

It follows that users do not typically attempt to operate signal processing equipment with mismatched or underpowered power supplies. When they do, it is generally an unintended accident, such as grabbing the wrong power supply, accidentally setting the output voltage incorrectly on a variable power supply, or mistakenly grabbing a dying battery. In all of these cases the signal processing equipment usually does not work as expected, if at all.

However it is also notable that many signal processing circuits have designs that permit them to operate within a range of currents and voltages, albeit with potentially degraded performance. A good example of such tolerance is a battery powered guitar pedal with a dying battery installed. As the battery finally dies, it does not damage the guitar pedal. The design of the signal processing circuit within the guitar pedal easily withstands the battery dying.

As the battery dies, I have found that the audio signal passing through the signal processing circuit briefly travels through an additional palette of changing timbres, above and beyond the palette of timbres produced by the signal processing circuit operating normally. This is because the dying battery is increasingly depriving the signal processing circuit of the power needed for typical operation, resulting in abnormal behavior. Unfortunately, this brief result is often short lived and not easily controllable, offering limited creative exploration of this phenomena.

This disclosure provides a solution to these issues. Accordingly, several advantages of one or more aspects are as follows: to provide touchless signal modifiers and a method of use, that can be used to dynamically vary the power supplied to a signal processing circuit, that impart the processed output signal of the signal processing circuit with additional desirable alteration above and beyond what is typically produced by the signal processing circuit, that vary the power supplied to a signal processing circuit with a method that incorporates expressive motion without requiring physical contact, that impart the processed output signal of the signal processing circuit with additional desirable alteration above and beyond what is typically produced by the signal processing circuit with a technique comprising touchless expressive motion of the human body without monopolizing the use of a hand, foot, specific limb or appendage. Other advantages of one or more aspects will be apparent from a consideration of the drawings and ensuing description.

DETAILED DESCRIPTION

First Embodiment—FIGS. 1, 2, 21, 23

Figure 1:
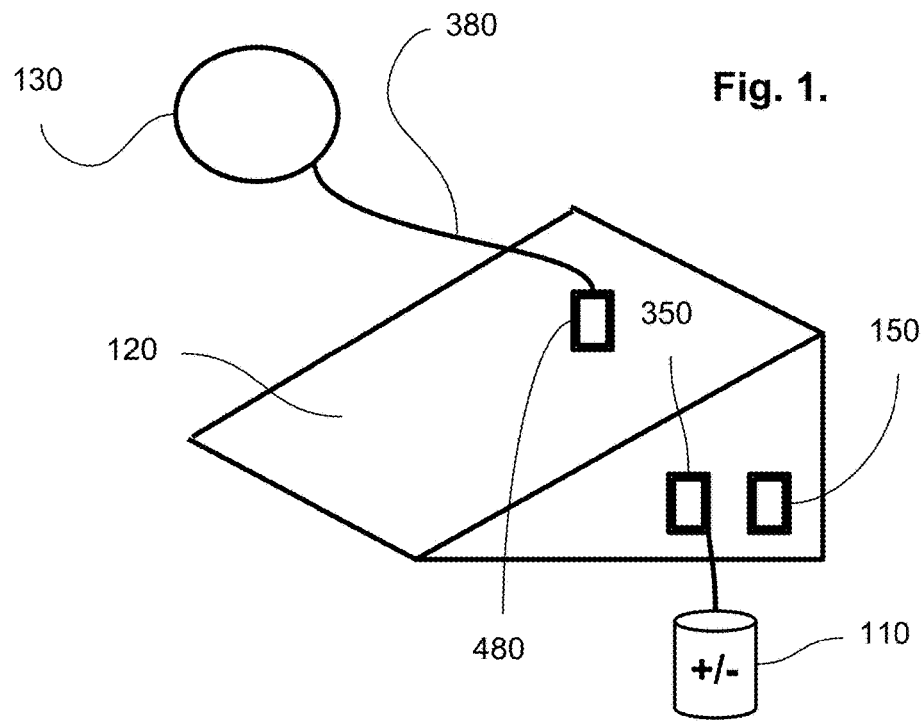
FIG. 1 shows a perspective view of various aspects of a touchless signal modifier in accordance with the disclosure.
Figure 2:
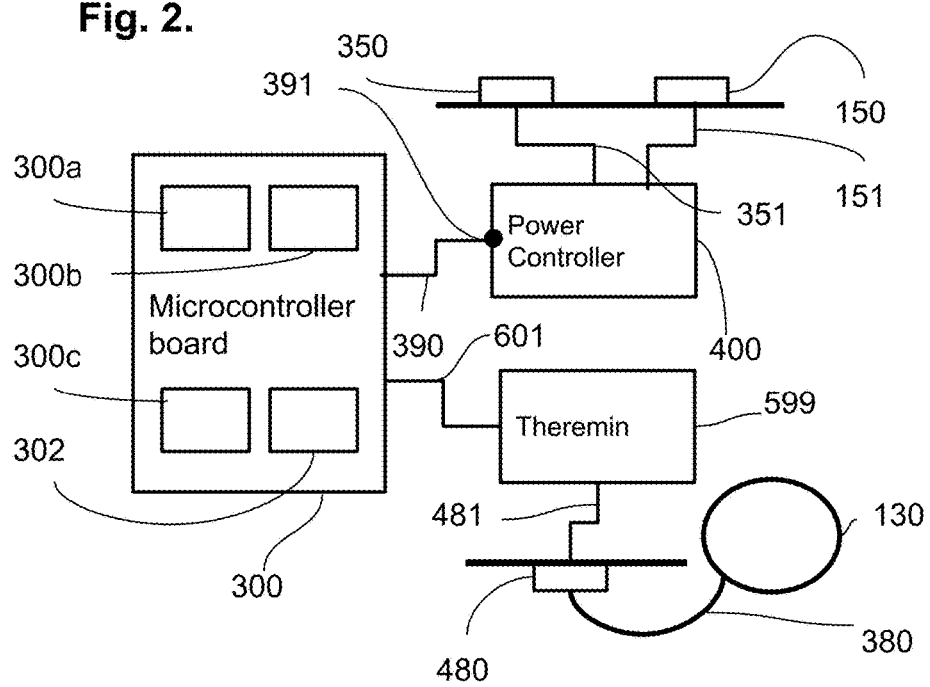
FIG. 2 shows a diagram displaying various aspects of the touchless signal modifier shown in FIG. 1.

One embodiment of the signal modifier is illustrated in FIG. 1 (top view) and FIG. 2 (internal diagram). There is shown an antenna 130. The antenna 130 can be a conductive material in almost any shape, but a satisfactory choice would be a round or square metal plate approximately 6"-12" in diameter. The antenna 130 is mounted on an adjustable wired antenna stand 380. A satisfactory choice for the adjustable wired antenna stand 380 would be a gooseneck stand, commonly used in podium microphones, with an added conductive wire used to electrically connect the antenna 130 to the antenna enclosure connection 480. The adjustable wired antenna stand 380 connects to an antenna enclosure connection 480 which is mounted upon an enclosure 120 and electrically connected inside the enclosure 120 to the internal antenna connection 481 which is connected to a touchless sensor 599. The output of the touchless sensor 599 is a touchless sensor output signal 601. In the example depicted here, the touchless sensor is a Theremin 599. Other types of touchless sensors are possible. The Theremin 599 is advantageous as a touchless sensor in that the touchless sensor output signal 601 from a Theremin 599 offers finer or smoother resolution and faster response times when compared to the touchless sensor output signal 601 received from some comparable distance sensors, such as some ultrasonic distance sensors. In the example depicted here, the touchless sensor output signal is a monophonic audio signal 601. Other types of touchless sensor output signals are possible.

In this embodiment, the Theremin 599 is a partial implementation of the electronic instrument, the Theremin, specifically the portion of the circuit therein that outputs a monophonic musical tone in response to the position of a human body or limb relative to an antenna. Several commercial kits are available which would be satisfactory as a choice for the Theremin 599 such as a kit offered by Harrison Instruments. It would also be satisfactory to construct a Theremin 599 from scratch using one of the many schematics available on the internet using parts sourced from an electronics distributor such as Digikey or Mouser. Extensive information on Theremin 599 construction and calibration is publicly available.

Figure 21:
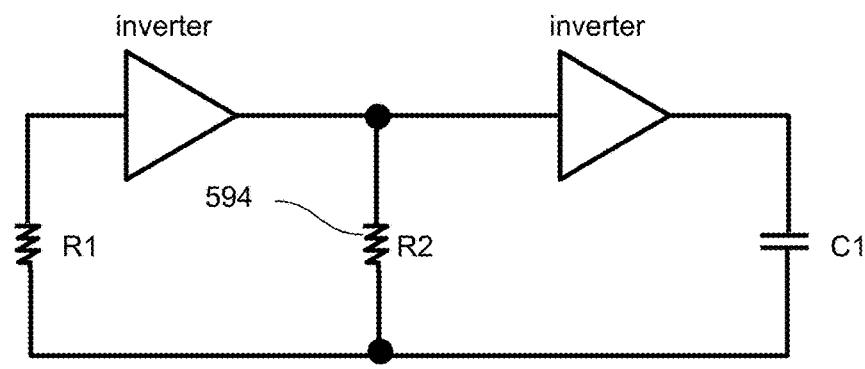
FIG. 21 shows a diagram of the first oscillator of the Theremin shown in FIG. 1.
Figure 23:
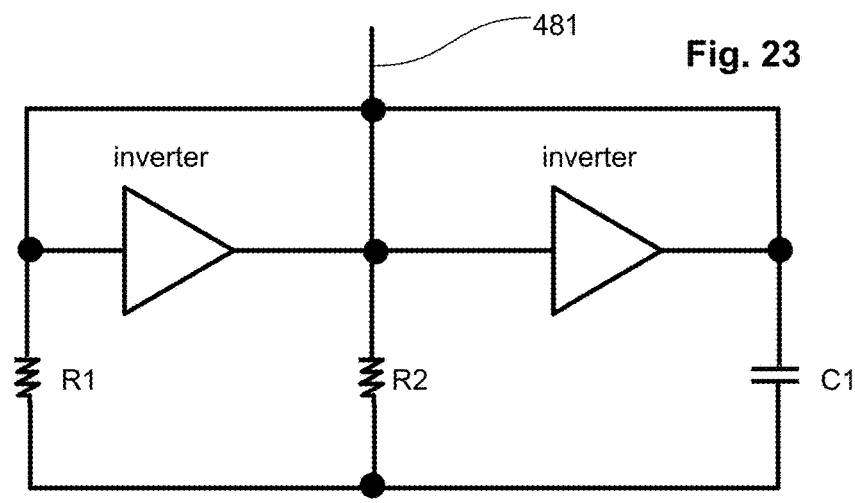
FIG. 23 shows a diagram of the second oscillator of a Theremin shown in FIG. 1.

In this embodiment, the Theremin 599 comprises a first oscillator and a second oscillator each of which are resistor-capacitor (RC) oscillators and are approximately tuned according to the equation $$\text{frequency} = 1/(2.2*C1*R2) \qquad \text{Formula 1:}$$

where C1 is the value of a capacitive element in the oscillator circuit and R2 is the value of a resistive element in the oscillator circuit. FIG. 21 shows a simple RC oscillator circuit that would be satisfactory as the first oscillator in the Theremin 599, although many other oscillator circuits would be satisfactory. In this embodiment, a potentiometer 594 is used for the R2 resistive element in the first oscillator so that the frequency can be easily adjusted, although a single fixed, a set of fixed value resistors, or a combination of these would also be satisfactory. FIG. 23 shows a simple RC oscillator circuit that would be satisfactory as the second oscillator in the Theremin 599, however many other oscillator circuits would be satisfactory. The second oscillator shown in FIG. 23 has an electrical connection to the internal antenna connection 481. These oscillator circuits are approximate examples of the "less than perfect oscillator" shown in the Fairchild Semiconductor Application Note 118 October 1974, included by reference, https://web.archive.org/web/20170209183114/https://www.fairchildsemi.com/application-notes/AN/AN-118.pdf The monophonic audio signal 601 approximately falls within a first predetermined range of values; a range that is determined by the calibration of the Theremin 599. The monophonic audio signal 601 is connected to a microcontroller board 300.

With continued reference to FIG. 2, the touchless signal modifier may also include a microcontroller board 300. The microcontroller board 300 is schematically shown as including a processor 300a and a non-transient storage medium or memory 300b, such as RAM, flash drive or a hard drive. Memory 300b is for storing executable code, the operating parameters, and the input from the operator user interface 302 while processor 300a is for executing the code. The electronic controller is also shown as including a transmitting/receiving port 300c, such as an Ethernet port for two-way communication with a WAN/LAN related to an automation system. A user interface 302 may be provided to activate and deactivate the system, allow a user to manipulate certain settings or inputs to the microcontroller board 300, and to view information about the system operation.

The microcontroller board 300 typically includes at least some form of memory 300b. Examples of memory 300b include computer readable media. Computer readable media includes any available media that can be accessed by the processor 300a. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 300a.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The microcontroller hoard 300 is also shown as having a number of inputs/outputs that may be used for implementing the below described methods A common commercially available option and a satisfactory choice for the microcontroller board 300 in this embodiment is a Teensy 3.2, though other choices are possible. The schematic for the Teensy 3.2 is available in the Teensy Reference Schematic https://web.archive.org/web/20170806054719/https://www.pjrc.com/teensy/schematic.html which is incorporated by reference.

In this embodiment, the monophonic output signal 601 has an approximate peak voltage of 2.5V and a +5V DC offset is placed upon the monophonic audio signal 601. The +5V DC offset constrains the signal approximately to a 0-5V range to meet the digital logic input tolerances for the microcontroller board 300. However, it would also be satisfactory to use a different DC offset or a DC offset of zero volts depending on the choice of microcontroller board 300.

Figure 20:
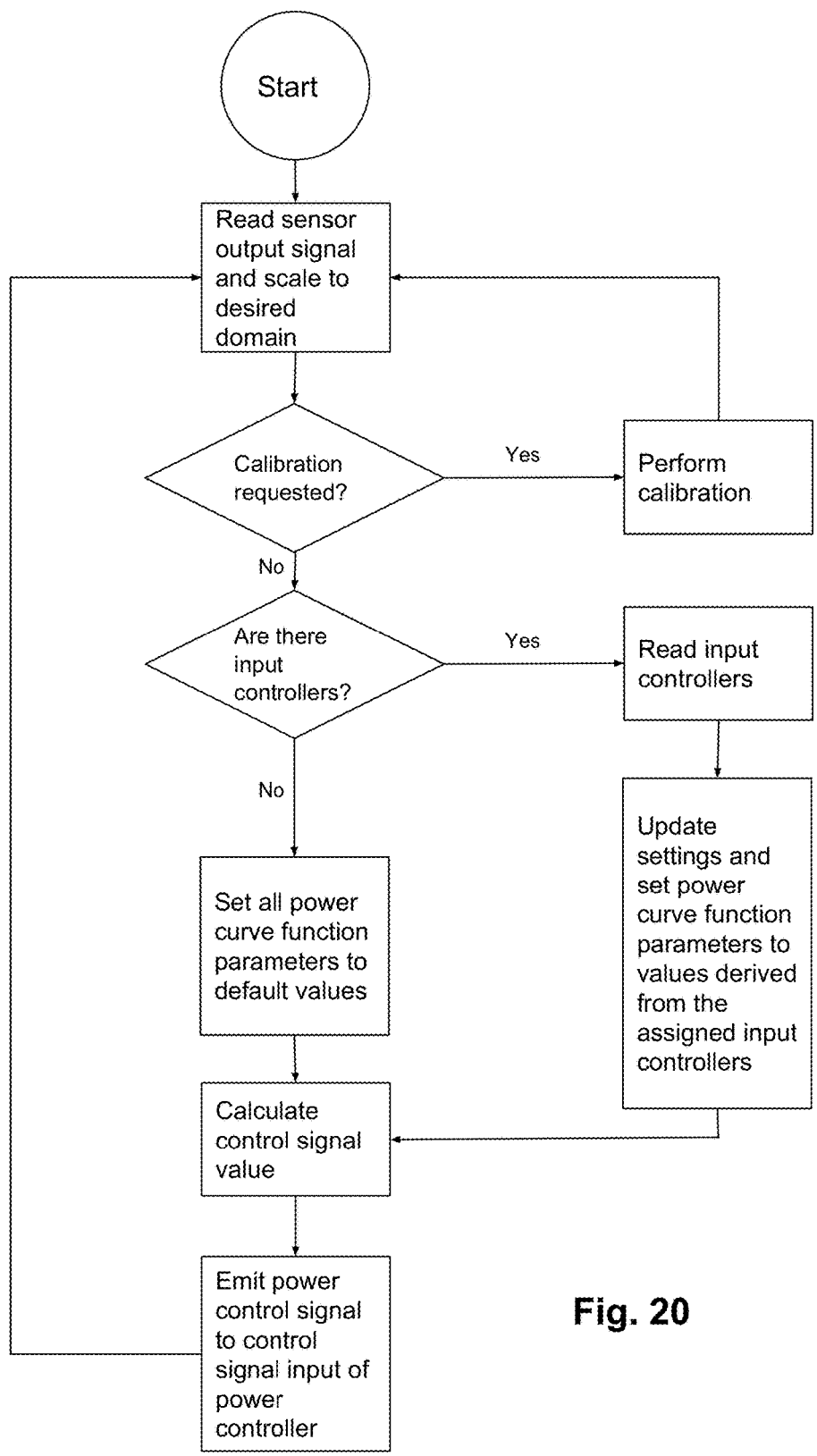
FIG. 20 shows a software flow diagram in accordance with the disclosure.

A software flow chart of the conversion algorithm programmed into the microcontroller board 300 is shown in FIG. 20.

The antenna 130, connected to the adjustable wired antenna stand 380, and the antenna enclosure connection 480 enables the positioning of the antenna 130 in an advantageous position for the user. The adjustable wired antenna stand 380 connects to the internal antenna connection 481 and on to the Theremin 599.

The microcontroller board 300 receives the monophonic audio signal 601 which falls within a first predetermined range of output values, a low and high frequency limit determined by the calibration of the Theremin 599. The microcontroller board 300 detects the frequency of the monophonic audio signal 601 using a frequency detection algorithm. A satisfactory frequency detection algorithm is available in the FreqMeasure library by Paul Stoffregen, although other software or hardware algorithms would also be satisfactory. In this embodiment a satisfactory first predetermined range of output values would be approximately 200 hz to 1600 hz, although other ranges are also satisfactory.

The microcontroller board 300 determines a scaling factor by calculating the ratio of (detected frequency−low frequency limit)/(high frequency limit−low frequency limit). When the detected frequency is 500 Hz, this scaling value is approximately (500−200)/(1600−200)=0.21429. This scaling factor is then used to obtain an equivalent value in another numeric range by multiplying the scaling factor against the maximum value of the desired zero-based range. Therefore, an equivalent scaled value in the zero-based range 0 to 65535 would be 14,043. In this way, the microcontroller board 300 derives a second value which is used as a control instruction for a power control signal 390 from the frequency detected in the monophonic audio signal 601. The microcontroller board 300 then emits the power control signal 390 to the control signal input 391 of the power controller 400 whereby the higher the detected frequency of the monophonic audio signal 601, the higher the derived value of the control instruction used to configure the power control signal 390. In this embodiment, the control instruction has a range of values of 0 to 65535, or 16-bit resolution. Other ranges and resolutions are also possible.

The power controller 400 receives this control instruction as a power control signal 390 at the control signal input 391. The power controller 400 is connected to a power source 110 through a power input 350 which continues on to a first power input connection 351. As the value of the control instruction rises and falls, the power controller 400 responds, increasing and decreasing the metered amount of power passing from the first power input connection 351, to a modified output power 151 and on to a power output 150. A satisfactory choice for the power output 150 would be a standard female panel mount connector such as a ⅛ inch tip/sleeve or barrel style connector. Another satisfactory choice for the power output 150 would be a permanently connected cable that extended outside of the enclosure 120 and terminated in a male ⅛ inch tip/sleeve, a male barrel connector, or bare wires. Other options that would be suitable for the power output 150 are possible.

In this embodiment, a satisfactory solution for the power control signal 390 is a pulse-width modulation or PWM signal, although a plurality of other communication protocols including but not limited to SPI (Serial Peripheral Interface) or I2C (Inter-integrated circuit) would also be satisfactory or dictated by the requirements of the power controller 400.

The power controller 400 controls the amount of power flowing in a circuit. This can be accomplished in a plurality of ways including but not limited to pairing an appropriate control signal to a voltage regulator, a controllable rheostat, a MOSFET (metal-oxide semiconductor field-effect transistor), an IGBT (insulated-gate bipolar transistor), a DAC (digital-analog converter), or a darlington transistor. In this example, the power controller 400 is a darlington transistor with a PWM control signal.

The darlington transistor has three pins, a base pin, an emitter pin, and a collector pin. The darlington transistor receives the PWM control signal at a base pin. The PWM control signal indicates to the darlington transistor how much power is allowed to flow from the emitter pin which is connected to the first power input connection 351 out to the collector pin, which continues on to the modified output power 151. The PWM control signal is set to the value of the control instruction, and upon receipt the darlington transistor increases or decreases the amount of time during which power is allowed to flow from the first power input connection 351 to the modified output power 151 and on to the power output 150 in response.

Figure 3:
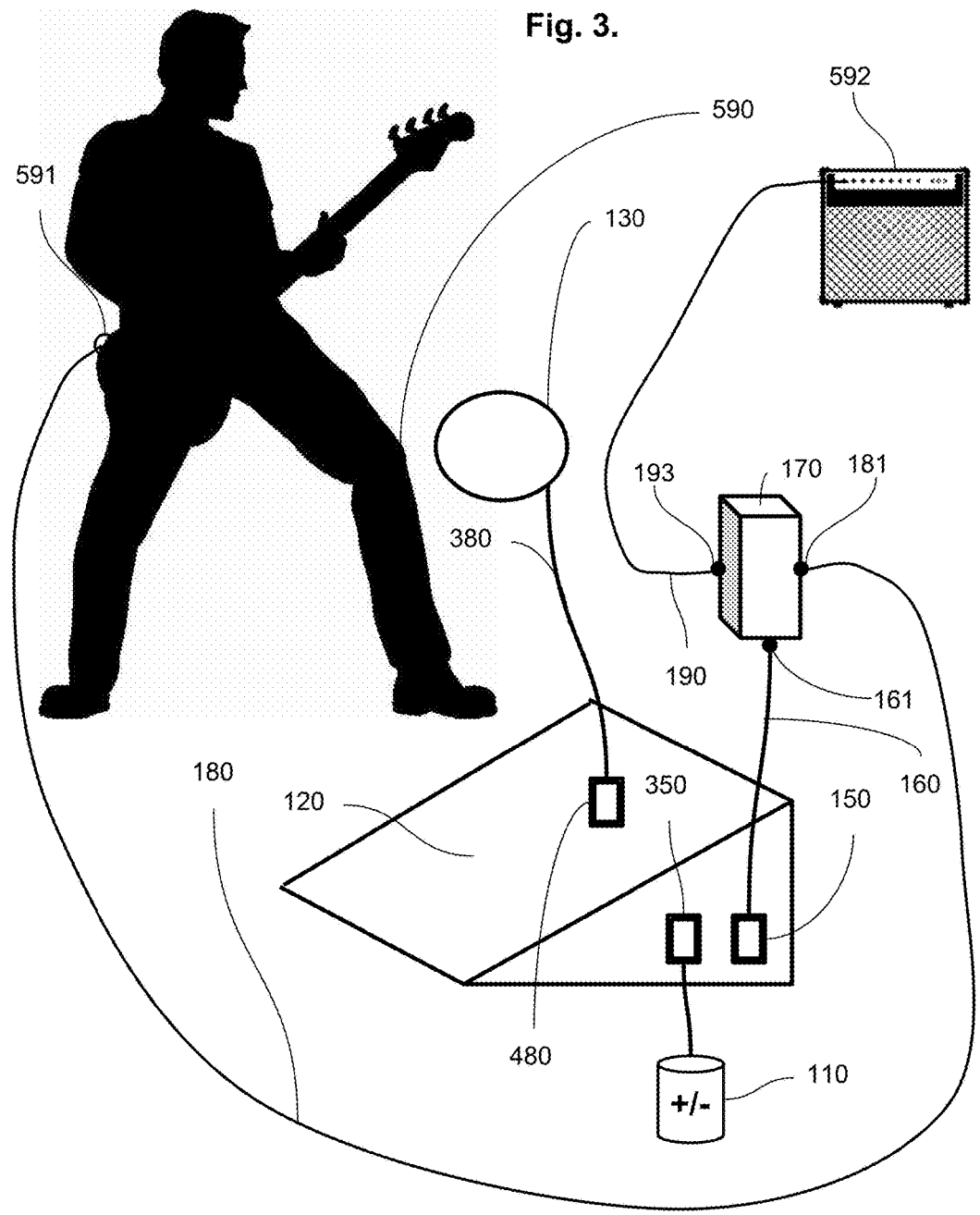
FIG. 3 shows a signal processing system displaying a perspective view of various aspects of the touchless signal modifier shown in FIG. 1 and a method of use.

Operation—FIGS. 2, 3, 21

A signal processing system comprising the touchless signal modifier shown in FIG. 2 with an audio-visual input device 591 and an audio-visual output device 592 is shown in FIG. 3. First, a power source 110 is connected to the power input 350, which connects to a first power input connection 351, continuing on to a power controller 400. Non-limiting examples of a power source include an internal power supply, a battery, and a "wall wart" AC power adapter Next, the power output 150 is connected to a signal processing circuit power input cable 160, and connected to a second power input connection 161 of an audio-visual signal processing circuit 170. By use of the term "audio-visual signal processing circuit" it is meant to include any signal processing circuit having audio only capabilities, visual only capabilities, and/or both audio and visual capabilities. Non-limiting examples of audio-visual signal processing circuits include audio effects pedals, audio expression pedals, analog television effects, luminance processors, chrominance processors, hue and saturation processors.

Next, the signal path is connected. In this embodiment, an audio-visual input device 591 emits an unprocessed input signal 180 which then connects to an input signal connection 181 of the audio-visual signal processing circuit 170. By use of the term "audio-visual input device" it is meant to include any input device having only audio only capabilities, visual only capabilities, and/or both audio and visual capabilities. Non-limiting examples of audio-visual input devices include microphones, cameras, electric guitars, and synthesizers.

In this example, the audio-visual input device is an electric guitar 591. In this example the audio-visual signal processing circuit is a guitar pedal 170. Non-limiting examples of guitar pedals include the Electro-Harmonix Mini Q-Tron and the MXR Delay.

The signal emerges in a modified state at an output signal connection 193 as a processed output signal 190 which is connected to an audio-visual output device 592. By use of the term "audio-visual output device" it is meant to include any output or capture device having audio only capabilities, visual only capabilities, and/or both audio and visual capabilities. Non-limiting examples of audio-visual output devices include a speaker, a guitar amplifier, a television or computer monitor, and a video projector. Non-limiting examples of audio-visual capture devices include a magnetic tape recorder, a digital audio workstation, and a video camera.

Next, the Theremin 599 is calibrated. The Theremin 599 is a musical instrument that can drift out of tune over time, and therefore must be regularly calibrated. There are different ways to calibrate a Theremin 599, many of which are satisfactory.

FIG. 21 shows the first oscillator. In this embodiment, the first oscillator is tuned by the human 590 manipulating a potentiometer 594 which in turn modifies the value of R2 in the oscillator circuit. The first oscillator frequency is tuned such that when it is combined with the second oscillator frequency a beat frequency within the range of human hearing results. The frequency of the second oscillator is similarly determined by the values of R2 and C1 but is furthermore variably tuned by the physical interaction between the human 590 and the antenna 130; as the antenna 130, which is electrically connected to the internal antenna connection 481, acts as a variable capacitor within the RC oscillator circuit. This beat frequency is output from the Theremin 599 as a monophonic audio signal 601.

In the quiescent state of the Theremin 599, the human 590 is approximately positioned at the desired maximum distance from the antenna 130. In this embodiment, the Theremin 599 is tuned such that the quiescent beat frequency is approximately 200 Hz to 3000 Hz and such that the beat frequency increases as the human 590 approaches the antenna 130.

Next, the human 590 positions themselves in close proximity to the antenna 130 and then moves toward and then away from the antenna 130 while generating and emitting a signal from the electric guitar 591. Although positioning any body part in close proximity to the antenna 130 would be satisfactory, selecting a knee offers the human 590 a satisfactory option to continue using both hands for other functions. In this embodiment, the use of a knee allows the human 590 to continue to use both hands to operate a musical instrument.

Changes in the distance between the human 590 and the antenna 130 cause a minute change in capacitance which in turn affects the second oscillator, shown in FIG. 23, which, when mixed with the output of the first oscillator, produces a beat frequency which is output from the Theremin 599 as a monophonic audio signal 601.

Following this, when the knee is brought increasingly close to the antenna, the frequency produced by the Theremin 599 increases. When this frequency increases, the microcontroller board 300 detects this change, and instructs the power control signal 390 to approximately increase, thereby increasing the amount of power flowing through and out of the power controller 400, to the modified output power 151, to the power output 150, further continuing into the signal processing circuit power input cable 160 which connects to the second power input connection 161, providing increasing power to the guitar pedal 170, causing additional, desirable, and perceptible alteration in the processed output signal 190 above and beyond the alteration created by the guitar pedal 170 operating normally.

Next, as the distance between the antenna 130 and the human 590 increases, the frequency produced by the Theremin 599 decreases, which in turn causes the microcontroller board 300 to detect a lower frequency, and subsequently compute a lower value for the control instruction used in the power control signal 390, which in turn reduces the amount of power that flows through and from the power controller 400 to the modified output power 151, to the power output 150, to the signal processing circuit power input cable 160, to the signal processing circuit power input connection 161, ultimately providing decreasing power to the guitar pedal 170, creating additional, desirable, and perceptible alteration in the processed output signal 190 above and beyond the alteration created by the guitar pedal 170 operating normally.

The rate at which this power control signal 390 changes is strongly affected by the instantaneous velocity of the human 590 in relation to the antenna 130. This instantaneous velocity can be controlled in a highly expressive way because the human body allows for very fine motor movements, ultimately allowing for subtle or dramatic modulation in the processed output signal 190. The results indicate advantageous new applications of this phenomena for live performers with minimal disruption to existing performance technique.

Figure 4:
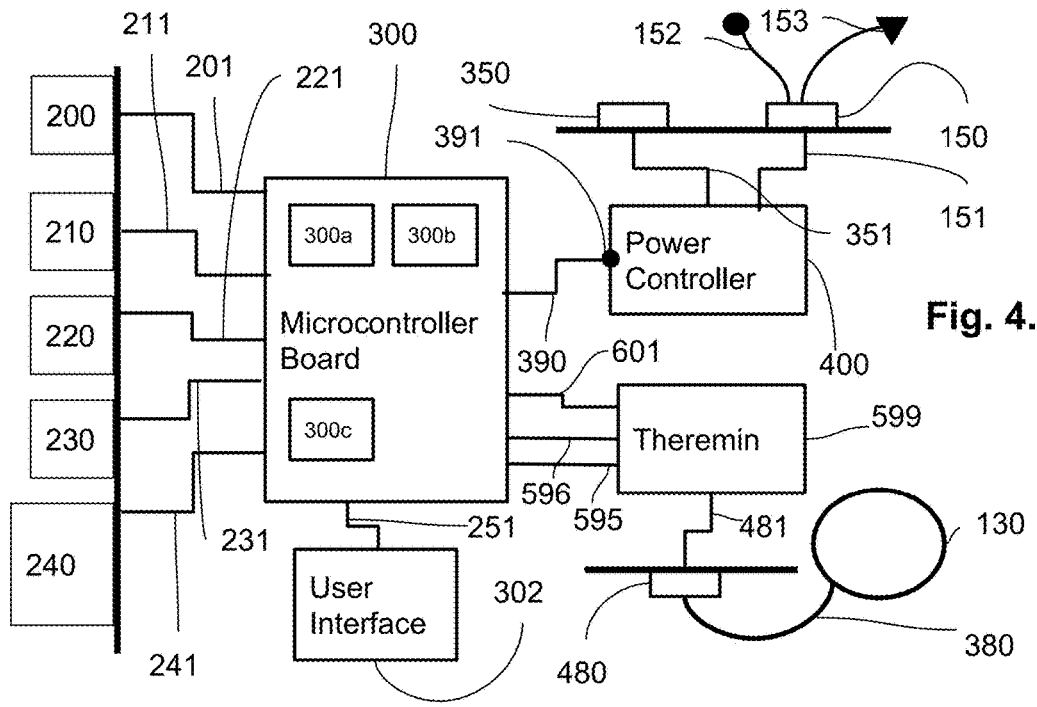
FIG. 4 shows a diagram displaying various aspects of a second example of a touchless signal modifier in accordance with the disclosure.
Figure 5:
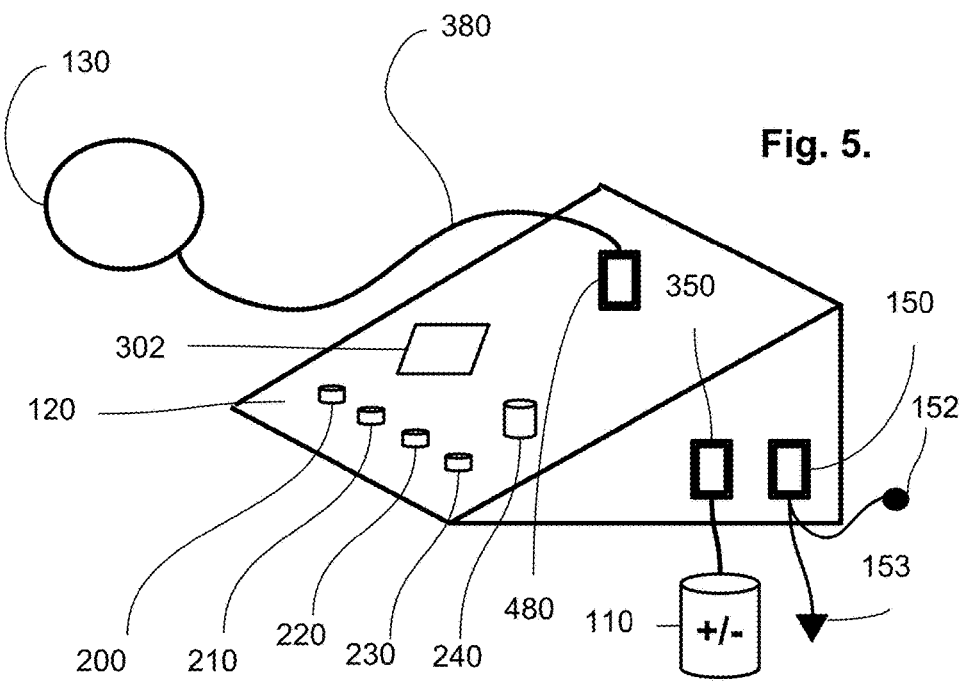
FIG. 5 shows a perspective view of an enclosure showing various aspects of the touchless signal modifier shown in FIG. 4.
Figure 6:
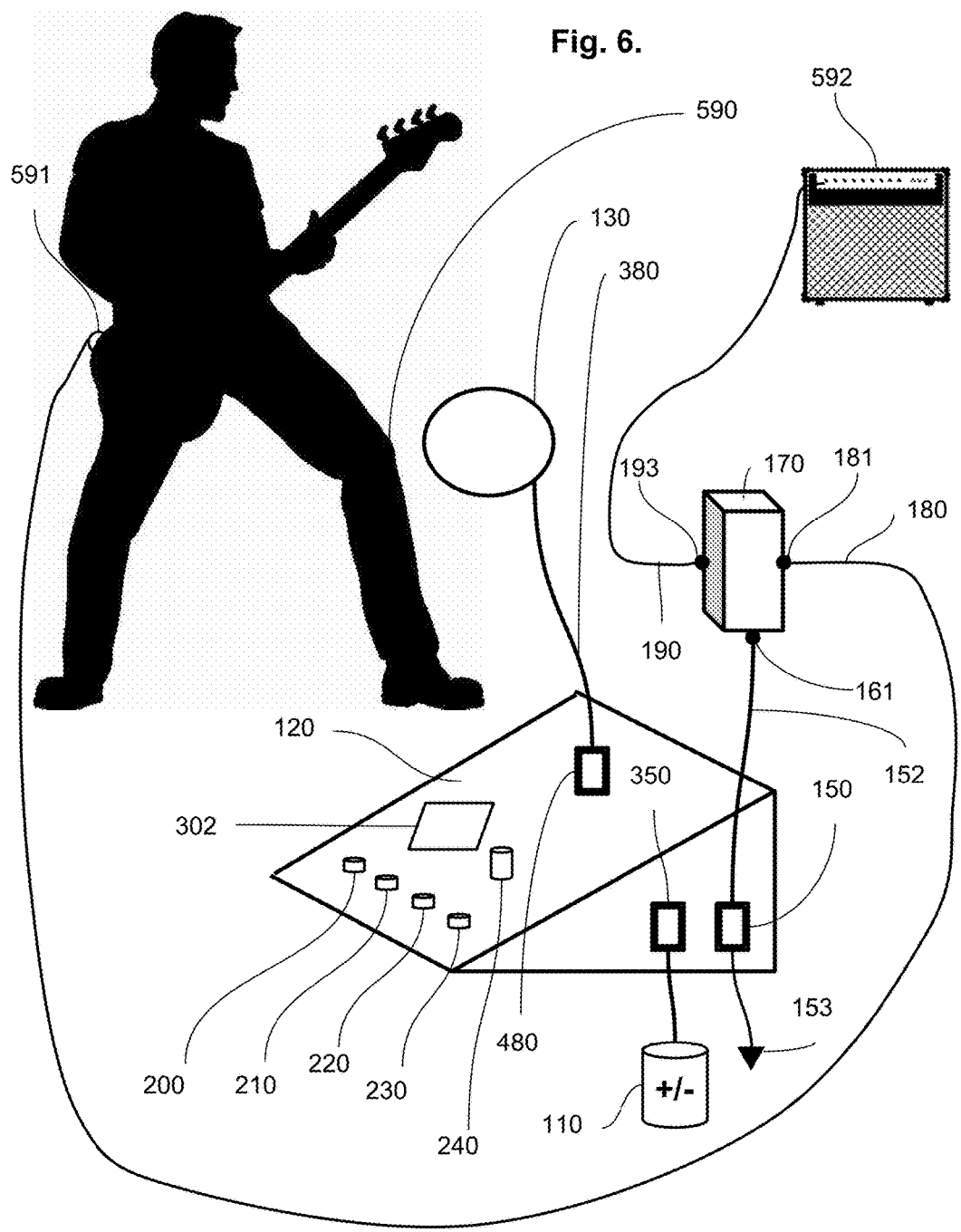
FIG. 6 shows a signal processing system displaying a perspective view of an enclosure showing various aspects of the touchless signal modifier shown in FIG. 4 and a method of use.
Figure 22:
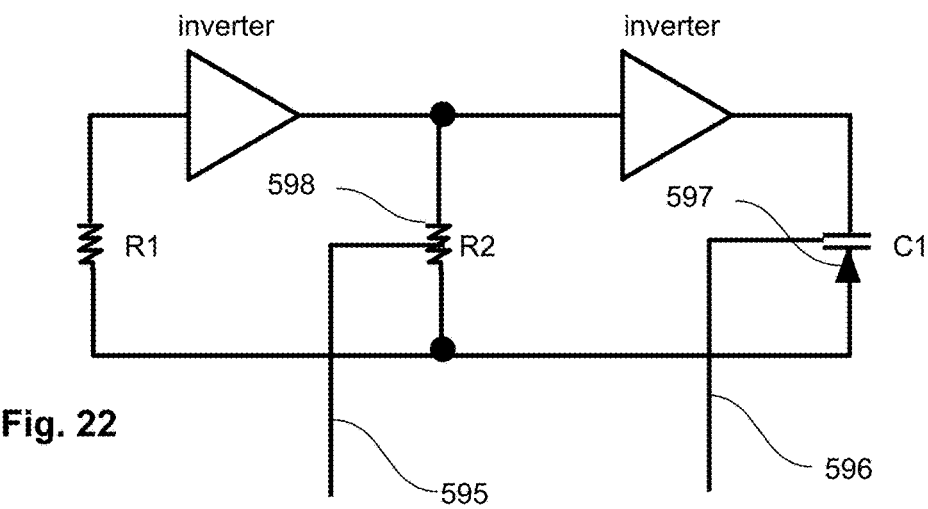
FIG. 22 shows a diagram of the first oscillator of the Theremin shown in FIG. 4.
Figure 24:
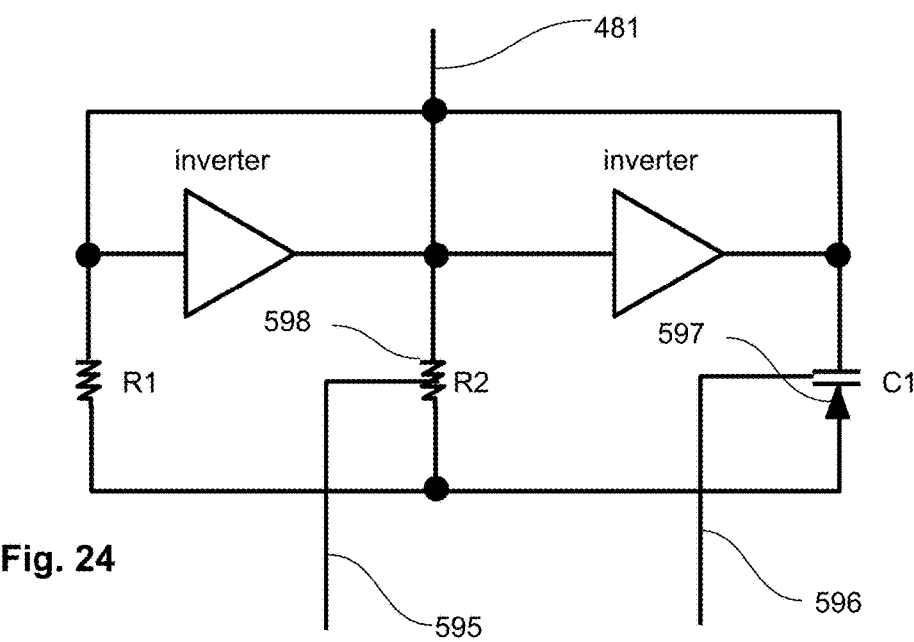
FIG. 24 shows a diagram of the second oscillator of a Theremin shown in FIG. 4.
Figure 25A:
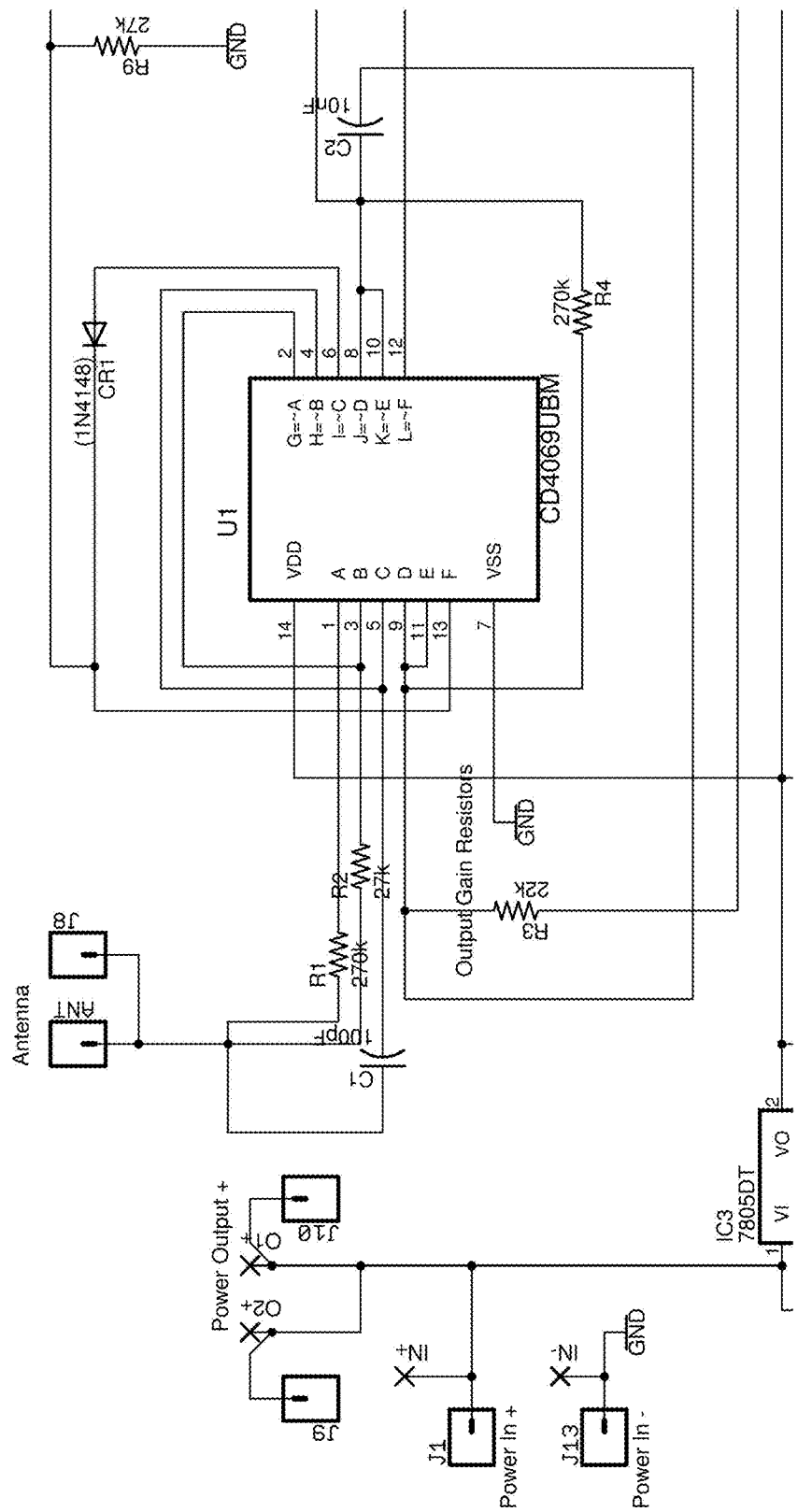
FIG. 25a shows the upper left quarter of a schematic diagram of the touchless signal modifier shown in FIG. 4.
Figure 25B:
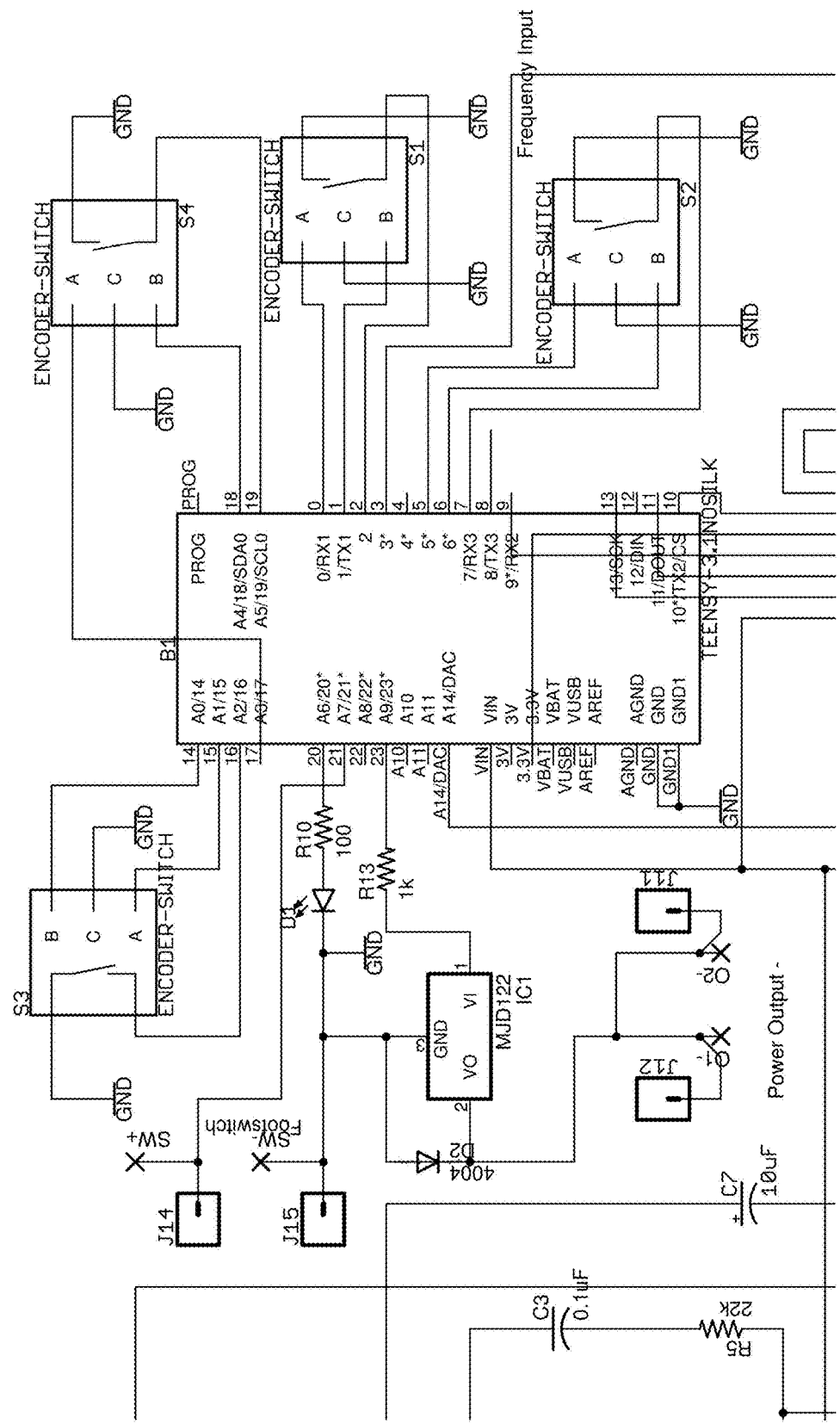
FIG. 25b shows the upper right quarter of a schematic diagram of the touchless signal modifier shown in FIG. 4.
Figure 25C:
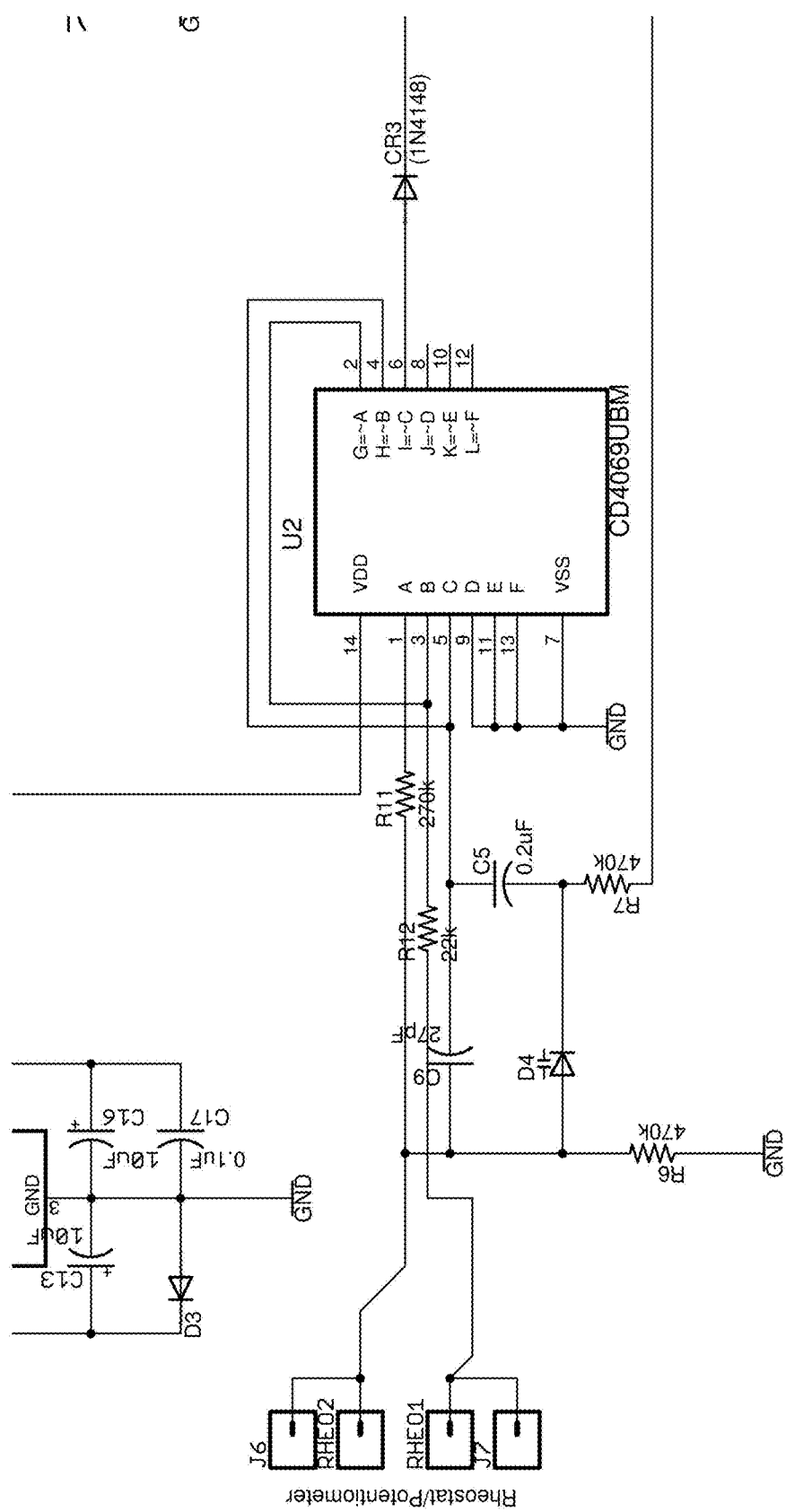
FIG. 25c shows the lower left quarter of a schematic diagram of the touchless signal modifier shown in FIG. 4.
Figure 25D:
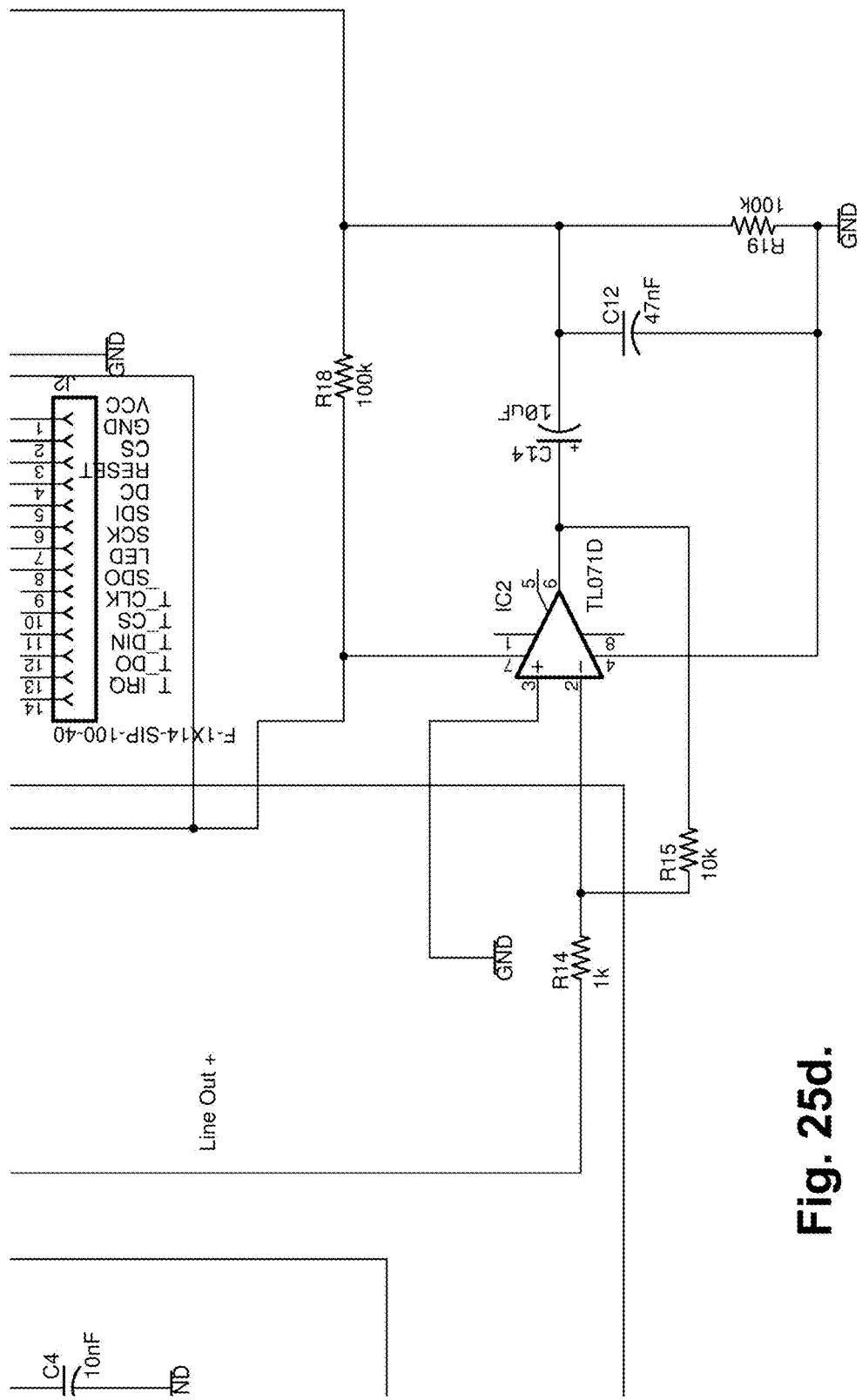
FIG. 25d shows the lower right quarter of a schematic diagram of the touchless signal modifier shown in FIG. 4.

FIGS. 4, 5, 6, 22, 24, 25*a*, 25*b*, 25*c*, 25*d*—Description of Additional Embodiment Another embodiment of the touchless signal modifier is illustrated in FIG. 4 (internal diagram), FIG. 5 (top view), FIG. 22 (diagram of first oscillator), FIG. 24 (diagram of second oscillator), and FIGS. 25*a*, 25*b*, 25*c*, 25*d* (schematic) A signal processing system comprising the touchless signal modifier shown in FIG. 4 and FIG. 5., an audio-visual input device 591, and an audio-visual output device 592 is shown in FIG. 6.

FIG. 22 shows the first oscillator within the Theremin 599 in this embodiment. The first oscillator contains a digital potentiometer 598 that is connected to the microcontroller board 300 by a resistive control signal 595. The first oscillator within the Theremin 599 also features a varactor diode 597 that is connected to the microcontroller board 300 by a capacitive control signal 596. A DC voltage in the range of approximately 0-3 v applied to the varactor diode 597 is a satisfactory choice for a capacitive control signal 596, although other signal choices would also be satisfactory, A signal indicating the current wiper position of the digital potentiometer 598 sent by a protocol such as SPI or I2C is a satisfactory solution for a resistive control signal 595, although other methods would also be satisfactory. It also would be satisfactory in this embodiment to replace one of the two variable RC (resistor-capacitor) oscillator parameters C1 (varactor diode 597) and R2 (digital potentiometer 598) with an equivalent, manual or static component, and further disconnecting the respective capacitive control signal 596 or resistive control signal 595. An algorithm to control the capacitive control signal 596 and the resistive control signal 595 is programmed into the microcontroller board 300.

A conversion algorithm that applies a scaling function to the power control signal 390 is programmed into the microcontroller board 300. A software flow chart of the conversion algorithm programmed into the microcontroller board 300 is shown in FIG. 20. In this embodiment, the value of the control instruction, which is used to derive the power control signal 390 and is a value within the 16-bit range of 0 and 65535, is calculated using a logistic function of the form:

$$y=h(65535/1+e^{(-k(x-x0))})+N \qquad \text{Function 2:}$$

where x is the range-scaled frequency of the monophonic audio signal 601, and y is the control instruction. Satisfactory preset parameter values here are h=1, k=1, x0=10, N=0, although other preset values would also be satisfactory. Although a logistic function is shown, other scaling functions, such as, but not limited to, an exponential or cotangent function, would also be satisfactory and it would be satisfactory to furthermore provide preset parameters and parameter values that are appropriate to the form and domain of the chosen scaling function.

The microcontroller board 300 takes a frequency measurement from the monophonic audio signal 601. The frequency measurement falls within a first predetermined range of values, and is constrained to this first predetermined range if it exceeds the range boundaries. This value is then translated to a zero-based value by subtracting the value of the first predetermined range low boundary from the frequency measurement, resulting in a first value. Next, the microcontroller board 300 translates this first value to a second value, x, which is in the second predetermined range of approximately (0, 20), in order to exploit the interesting contours of the logistic scaling function with the above preset parameter values. To do this, the microcontroller board 300 scales the first value from within the range of (0, first predetermined range high boundary−first predetermined range low boundary) to approximately within the range of (0, 20). This produces a range-scaled value of x which is subsequently used in the scaling function to compute the value of a control instruction, which is subsequently used to configure the power control signal 390.

In this embodiment, the curve of the logistic function is further modified by adjusting the preset parameters k, x0, h, and N. This provides the option to customize the shape of the power curve as desired, which is advantageous for certain signal processing circuits. It would furthermore be satisfactory to provide some, all, or none of these preset parameters and input controllers, as desired, instead using a fixed predetermined value for the preset parameter represented by the respective omitted input controller.

Figure 10:
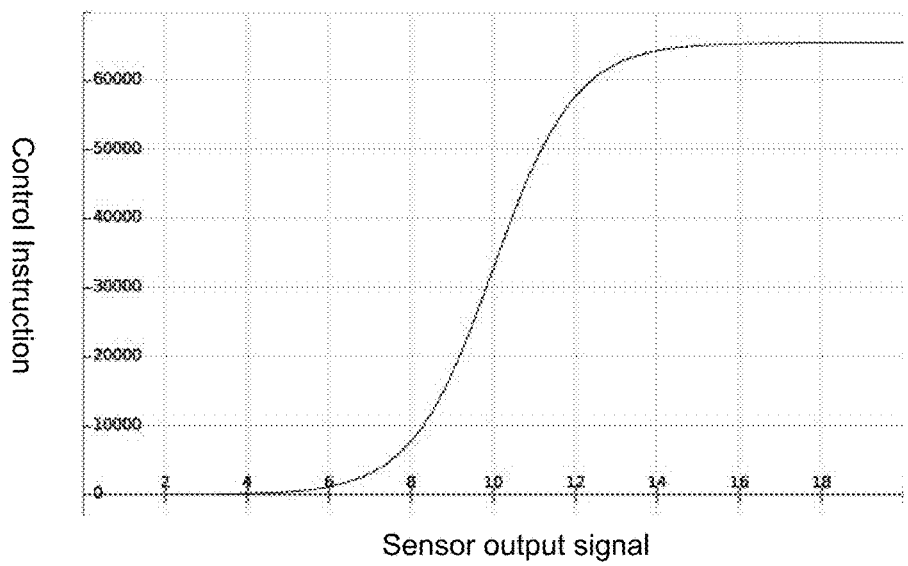
FIG. 10 shows a plot of a logistic scaling function of sensor output signal vs. control instruction in accordance with the embodiment.
Figure 11:
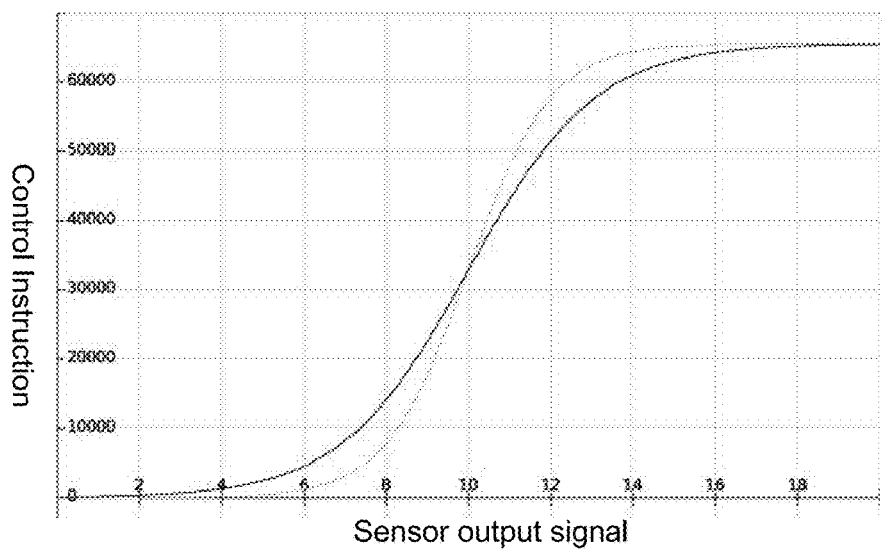
FIG. 11 shows the plots of two logistic scaling functions of sensor output signal vs. control instruction where the gray line shows the control plot of FIG. 10 and the black line shows the plot adjusted for parameter k=0.65 in accordance with the disclosure.
Figure 12:
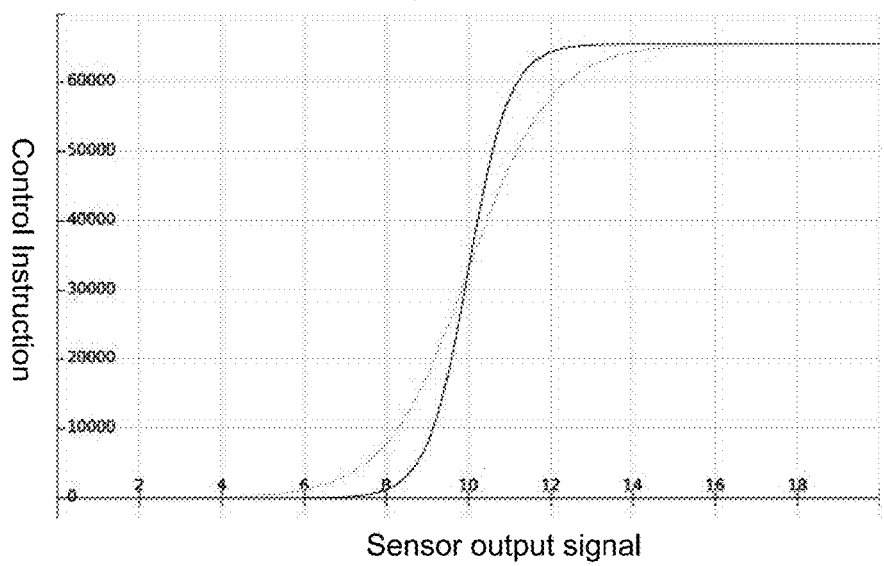
FIG. 12 shows the plots of two logistic scaling functions of sensor output signal vs. control instruction where the gray line shows the control plot of FIG. 10 and the black line shows the plot adjusted for parameter k=2 in accordance with the disclosure.

A first input controller 200 is connected to a first input controller signal output 201 which is connected to a microcontroller board 300 and through these electrical connections the first input controller 200 indicates values for the preset parameter k to the microcontroller board 300. A useful range of values for the preset parameter k is 0.65 to 2.0, although other ranges are satisfactory. FIG. 11 shows the scaling function of FIG. 10 in light gray contrasting the scaling function with k=0.65 in black. FIG. 12 shows the scaling function of FIG. 10 in light gray contrasting the scaling function with k=2.0 in black.

Figure 13:
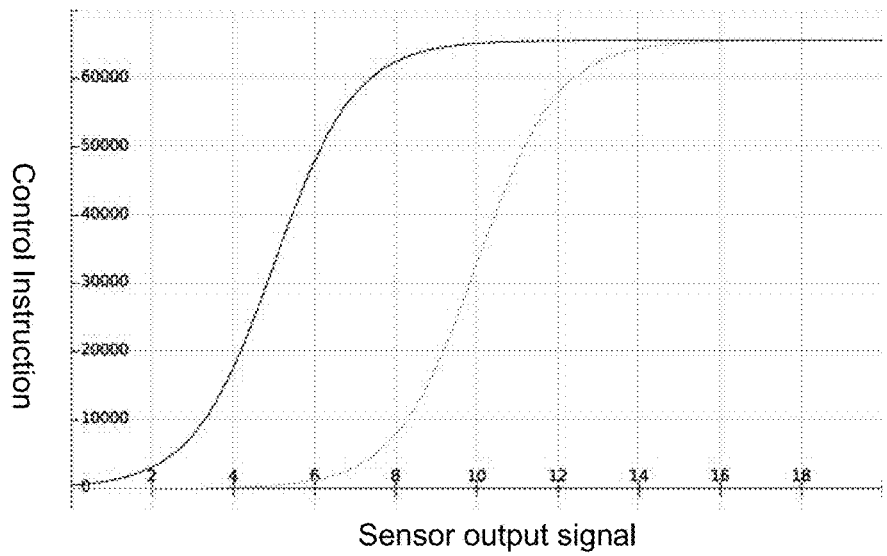
FIG. 13 shows the plots of two logistic scaling functions of sensor output signal vs. control instruction where the gray line shows the control plot of FIG. 10 and the black line shows the plot adjusted for parameter x0=5 in accordance with the disclosure.
Figure 14:
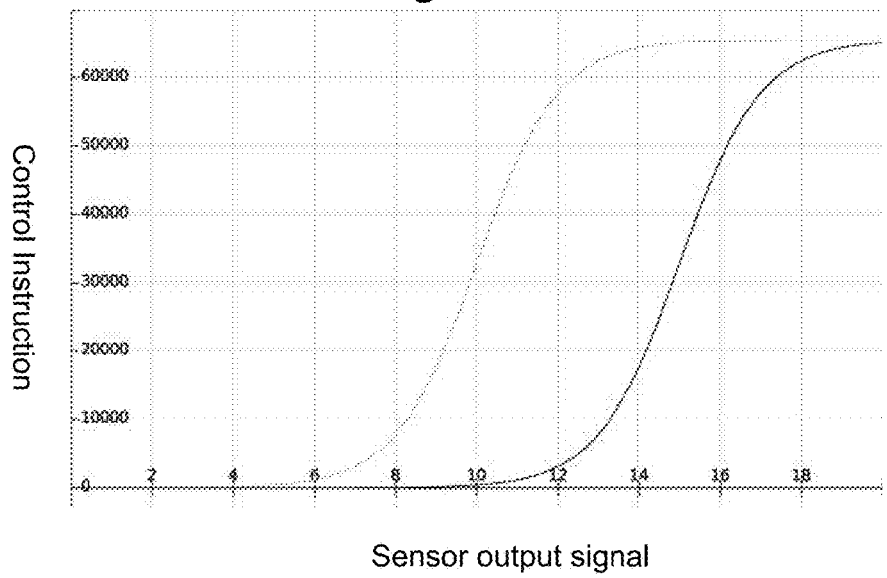
FIG. 14 shows the plots of two logistic scaling functions of sensor output signal vs. control instruction where the gray line shows the control plot of FIG. 10 and the black line shows the plot adjusted for parameter x0=15 in accordance with the disclosure.

A second input controller 210 is connected to a second input controller signal output 211 which is connected to a microcontroller board 300 and through these electrical connections the second input controller indicates values for the preset parameter x0 to the microcontroller board 300. A useful range of values for the preset parameter x0 is 5.0 to 15.0, although other ranges are satisfactory. FIG. 13 shows the scaling function of FIG. 10 in light gray contrasting the scaling function with x0=5 in black. FIG. 14 shows the scaling function of FIG. 10 in light gray contrasting the scaling function with x0=15 in black.

Figure 15:
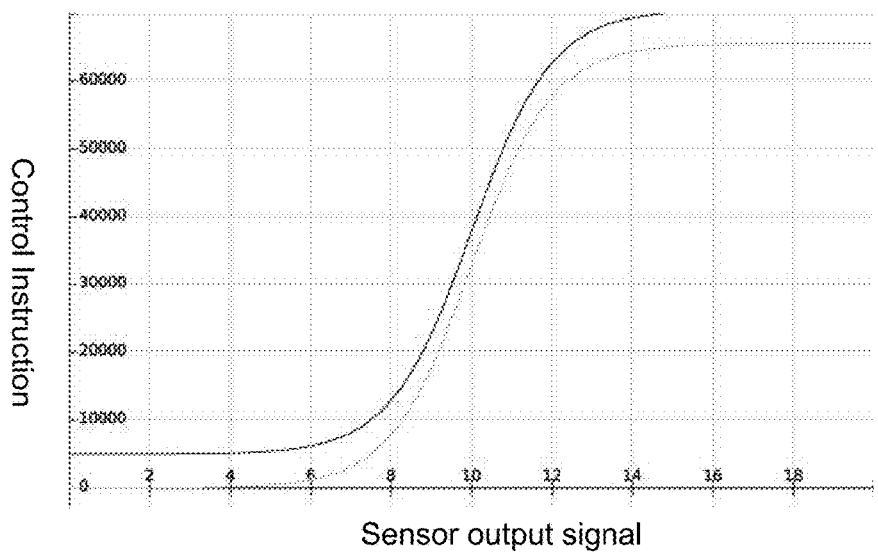
FIG. 15 shows the plots of two logistic scaling functions of sensor output signal vs. control instruction where the gray line shows the control plot of FIG. 10 and the black line shows the plot adjusted for parameter N=5000 in accordance with the disclosure.
Figure 16:
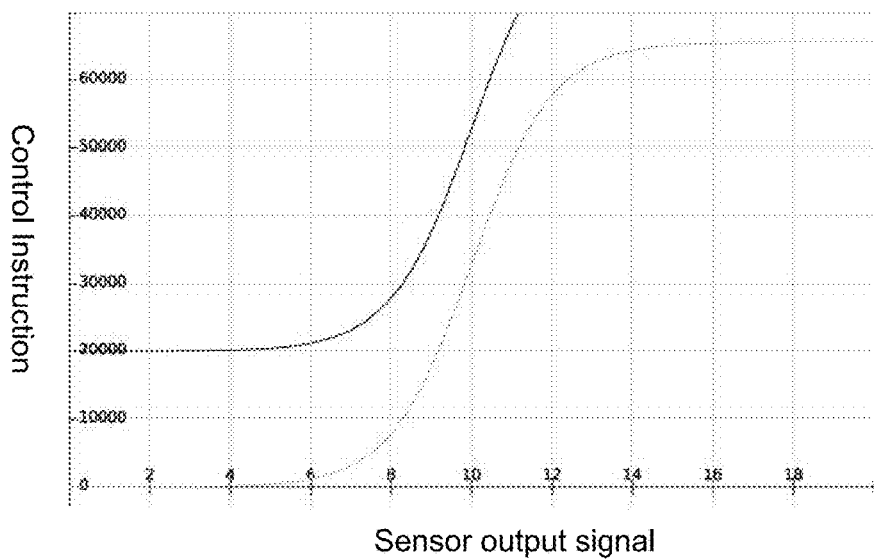
FIG. 16 shows the plots of two logistic scaling functions of sensor output signal vs. control instruction where the gray line shows the control plot of FIG. 10 and the black line shows the plot adjusted for parameter N=20,000 in accordance with the disclosure.

A third input controller 220 is connected to a third input controller signal output 221 which is connected to the microcontroller board 300 and through these electrical connections the third input controller 220 indicates values for the preset parameter N to the microcontroller board 300. A useful range of values for the preset parameter N is −20,000 to 20,000, although other ranges are satisfactory. FIG. 15 shows the scaling function of FIG. 10 in light gray contrasting the scaling function with N=5,000 in black. FIG. 16 shows the scaling function of FIG. 10 in light gray contrasting the scaling function with N=20,000 in black.

Figure 17:
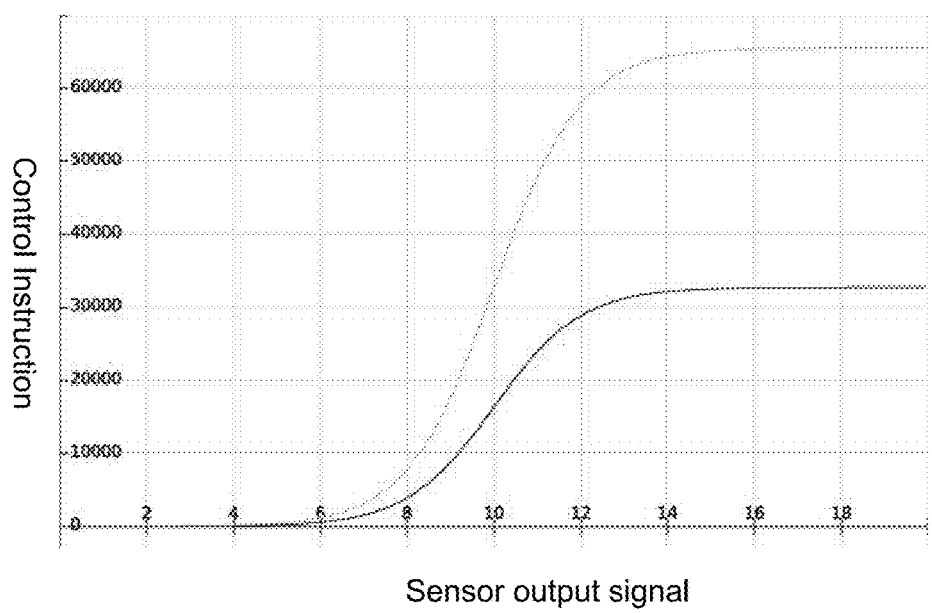
FIG. 17 shows the plots of two logistic scaling functions of sensor output signal vs. control instruction where the gray line shows the control plot of FIG. 10 and the black line shows the plot adjusted for parameter h=0.5 in accordance with the disclosure.

A fourth input controller 240 is connected to a fourth input controller signal output 231 which is connected to the microcontroller board 300 and through these electrical connections the fourth input controller 240 indicates values for the preset parameter h to the microcontroller board 300. A useful range of values for the preset parameter h is 0.25 to 1.0, although other ranges are satisfactory. FIG. 17 shows the scaling function of FIG. 10 in light gray contrasting the scaling function with h=0.5 in black.

For the input controllers 200, 210, 220, and 230, a rotary encoder, potentiometer, fader, or touchscreen would be a satisfactory implementation choice, although several other options would also be satisfactory. The input controllers here also may be regarded as embodiments or extensions of the user interface 302 of the microcontroller board 300.

A switch 240 is connected to a switch signal output 241 which is connected to the microcontroller board 300. A foot operated switch would be a satisfactory choice for the switch 240, but other switch choices would also be satisfactory. When the switch 240 is toggled, the microcontroller board 300 sets the preset value of the power control signal 390 to 65535, effectively deactivating the scaling activity on the power control signal 390. When the switch 240 is toggled again, the scaling activity on the power control signal 390 is active.

Next, the microcontroller board 300 calculates a control instruction and uses it to configure and emit the power control signal 390 to the control signal input 391.

A user interface 302 is connected to a communication connection 251 which is connected to the microcontroller board 300. In this example, the user interface is a touchscreen 302. Other user interfaces are possible. Non-limiting examples of user interfaces further include non-touchscreen displays, liquid crystal based displays (LCDs), light emitting diode based displays (LED displays), touchscreens, and USB (universal serial bus) connectors, Non-limiting examples of communication connections include USB cables, multi-conductor cables, bluetooth, ethernet, or wireless connections. Other wired and wireless choices for a communication connection 251 are possible.

Figure 18:
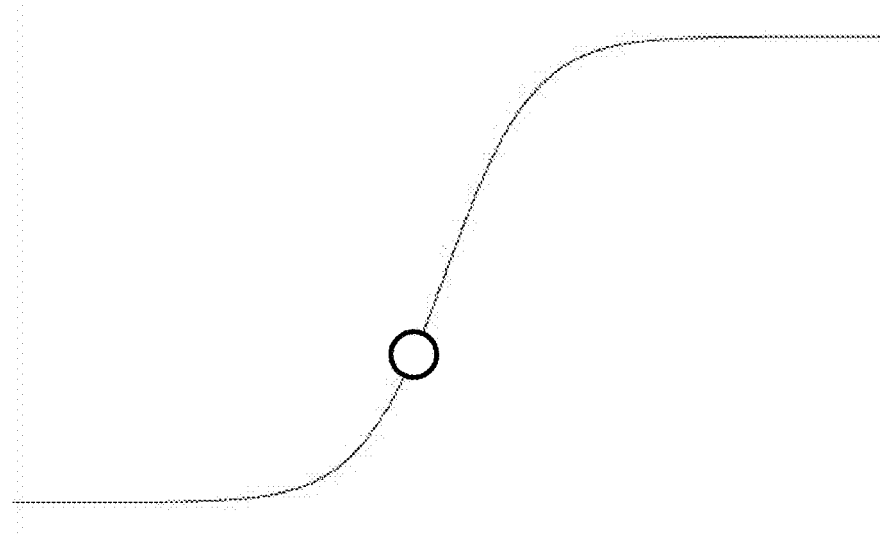
FIG. 18 shows a graphical rendering of an approximately instantaneous measurement of a sensor output signal, indicated by a circle, superimposed upon a plot of a scaling function in accordance with the disclosure.

The microcontroller board 300 sends an information output to the touchscreen 302 via the communication connection 251. FIG. 18 shows a satisfactory choice for the information output: a graphical display of sensor output signal plotted upon the scaling function, with a circle showing the instantaneous range-scaled sensor output signal value, and a black line showing a scaling function of the type shown in FIGS. 10, 11, 12, 13, 14, 15, 16, and 17. Other non-limiting examples of information output include serial data, status data, preset data, and operational status information, The touchscreen 302 sends any touchscreen input information to the microcontroller board 300 via the communication connection 251. It is possible to create additional input controllers for selecting or modifying preset parameters by creating an onscreen slider or knob on the touchscreen 302.

These additional input controllers allow finer contouring of the power control signal 390 which can be very useful when attempting to customize the power curve to the flatter the behavior of different signal processing circuits. However, operation of an embodiment does not rely on the availability of these additional input controllers. Following this, it would be satisfactory to provide any combination of zero, one, two, three, four, five, or more additional input controllers, as desired, to provide useful but optional interface elements for preset values.

In this embodiment, a ⅛ inch tip/sleeve male terminated power output cable 152 and a male barrel connector terminated power output cable 153 are each permanently connected to the power output 150, making the most common styles of power cable found in commercial guitar pedal 170 circuits easily available. Power cables with other terminating ends would also be satisfactory for permanent connection to the power output 150, as would the substitution of female panel mount jacks for the permanently connected wires as shown in FIG. 1. A circuit schematic of the touchless signal modifier shown in FIG. 4 and FIG. 5 is shown in FIGS. 25a, 25b, 25c, 25d.

FIG. 6, 22, 24—Operation of Additional Embodiment

First, the Theremin 599 is calibrated. The human 590 is positioned at the desired maximum distance from the antenna 130 such that the second oscillator within the Theremin 599 is minimally affected by capacitance seen at the antenna 130. FIG. 22 shows the second oscillator within the Theremin 599. The microcontroller board 300 then manipulates the frequency of the first oscillator within the Theremin 599 by sweeping the range of the resistive control signal 595 causing a change in the value R2, or sweeping the range of the capacitive control signal 596 causing a change in the value C1, or both. The frequency of the first oscillator can be approximately calculated with the formula $1/(2.2*R2*C1)$ where R2 is the instantaneous resistance value of the digital potentiometer 595 and C1 is the instantaneous capacitive value of the varactor diode 597 as it is biased by the capacitive control signal 596.

This manipulation continues as the microcontroller board 300 analyzes the monophonic audio signal 601 until the quiescent beat frequency resulting from the combination of the frequency output of the first and second oscillators is approximately 200 Hz to 3000 Hz, and such that this beat frequency increases as the human 590 approaches the antenna 130. Next, in FIG. 6, the human 590 generates and emits a signal from the electric guitar 591, and moves towards the antenna 130 to a first distance, and then away from the antenna 130 to a second distance, and to positions in between those distances, as desired. The human 590 furthermore adjusts the first input controller 200, the second input controller 210, the third input controller 220, and the fourth input controller 230 changing the preset parameter inputs to the conversion algorithm programmed into the microcontroller board 300 thereby affecting the power control signal 390. The human 590 sees the results of the modifications on the touchscreen 302, wherein a visualization that approximates the shape of the resulting conversion algorithm is displayed, upon which an approximately instantaneous reading of the sensor output signal, which in this embodiment is the monophonic audio signal 601 is plotted, such as is shown in FIG. 18.

The human 590 sets a preset value for N using the third input controller 220. This is because it is notably the case that some signal processing circuits have minimum power requirements in order to engage their signal processing function and produce a processed output signal 190, and because it is also the case that some signal processing circuits emit clicks, pops, or noise as the signal processing function disengages when power falls below a minimum value. It is therefore advantageous to provide a solution to prevent power from falling below a minimum value for some signal processing circuits. The human 590 therefore manipulates the third input controller 220 to set a preset value for N such that the power control signal never falls below a certain value, thereby supplying the guitar pedal 170 at all times with at least a minimum amount of power, while still offering the human 590 the ability to use the antenna 130 to further vary the power control signal 390 in the remaining headroom, without the unwanted risk of disengaging the signal processing function of the guitar pedal 170.

The human 590 sets a preset value for k using the third input controller 200, changing the shape of the scaling function to best exploit the behavior of the chosen guitar pedal 170. FIG. 11 shows the scaling function of FIG. 10 in light gray contrasting the scaling function with k=0.65 in black. FIG. 12 shows the scaling function of FIG. 10 in light gray contrasting the scaling function with k=2.0 in black.

The human 590 sets a preset value for x0 using the third input controller 210, changing the shape of the scaling function to best exploit the behavior of the chosen guitar pedal 170. FIG. 13 shows the scaling function of FIG. 10 in light gray contrasting the scaling function with x0=5 in black. FIG. 14 shows the scaling function of FIG. 10 in light gray contrasting the scaling function with x0=15 in black.

The human 590 sets a preset value for h using the third input controller 220, changing the shape of the scaling function to best exploit the behavior of the chosen guitar pedal 170. FIG. 15 shows the scaling function of FIG. 10 in light gray contrasting the scaling function with N=5,000 in black. FIG. 16 shows the scaling function of FIG. 10 in light gray contrasting the scaling function with N=20,000 in black.

The human 590 engages the switch 240 setting the value of the power control signal 390 to approximately the maximum value of the second predetermined range of values, bypassing the scaling function, effectively allowing full power to pass to the guitar pedal 170. The human 590 engages the switch 240 again, reactivating the scaling activity upon the power control signal 390. It would also be satisfactory to assign the function of the switch 240 to another purpose, such as but not limited to inverting the scaling function across the x-axis, changing the resolution of the power control signal 390, toggling a configuration mode, loading a preset for a specific audio-visual signal processing circuit 170, holding steady the present instantaneous value of the power control signal 390, or synchronizing device settings with an internet resource such as a website or social network.

Figure 7:
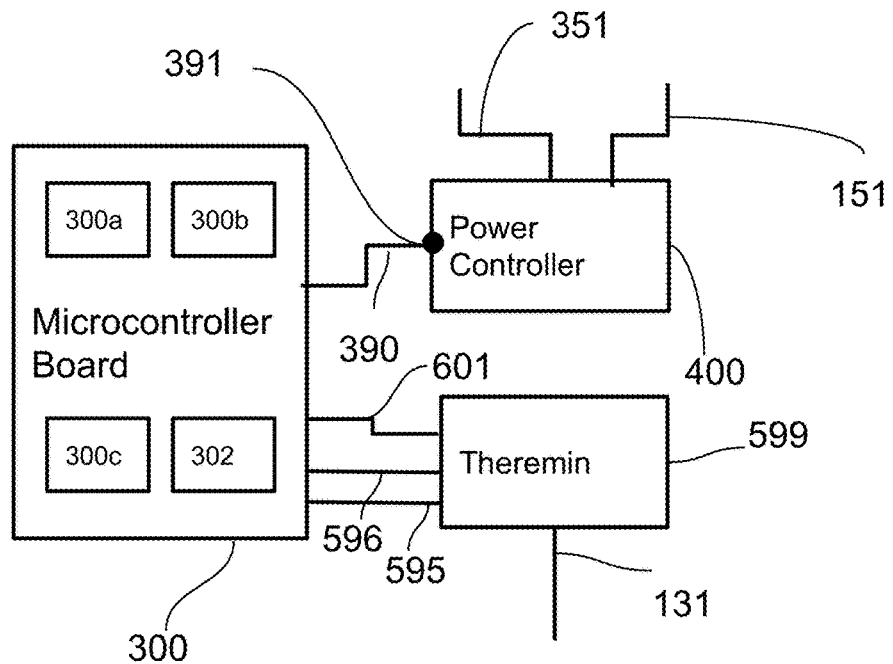
FIG. 7 shows a diagram displaying various aspects of a third example of a touchless signal modifier in accordance with the disclosure.

The human 590 sees the results of the modifications on the touchscreen 302, continues to make further adjustments to the input controllers as needed, requests calibration of the Theremin 599 as needed, loads preset parameters, modifies preset parameters, saves preset parameters, and shares preset parameters FIG. 7—Description of Additional Embodiment FIG. 7 shows an additional embodiment suitable for internal installation in another device. This would be a satisfactory technique for directly incorporating the embodiment into a distinct machine, such as the enclosure of the audio-visual signal processing circuit 170 itself.

The external connective elements and the enclosure 120 have been removed. All electrical connections are made directly with the modified output power 151 and the first power input connection 351. The second power input connection 161 of an audio-visual signal processing circuit 170 is implemented as a raw wire terminal, or a solder point on a circuit board.

The antenna 130 and its associated connective elements are replaced by a minimum antenna 131, which is simply a predetermined quantity of electrically conductive material. A satisfactory choice for a minimum antenna 131 would be a solder terminal, a circuit trace, or a length of conductive wire cut to a predetermined length, although other choices of electrically conductive material would also be satisfactory. The minimum antenna 131 interacts with a human 590 in the same manner as the antenna 130.

Figure 8:
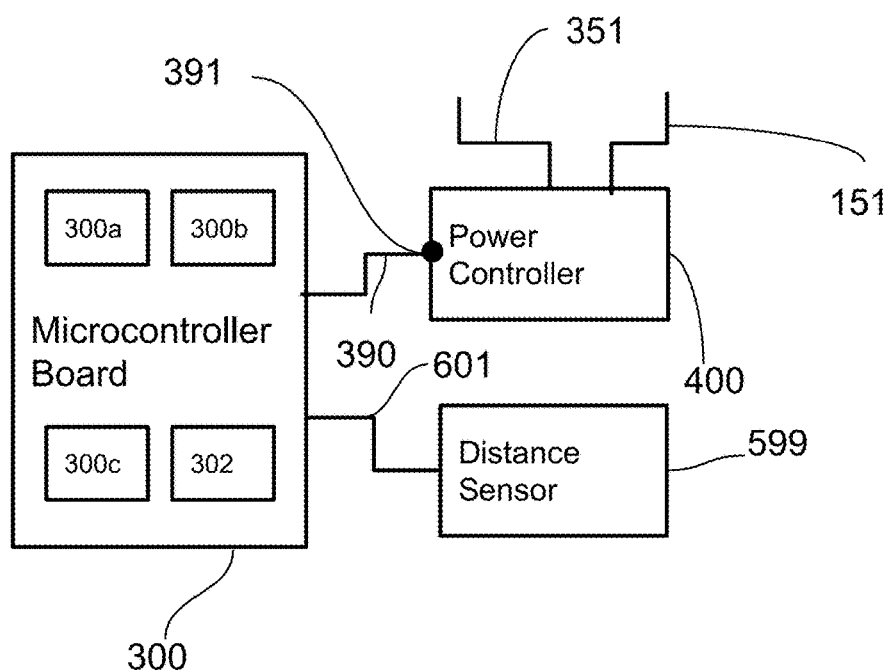
FIG. 8 shows a diagram displaying various aspects of a fourth example of a touchless signal modifier in accordance with the disclosure.
Figure 9:
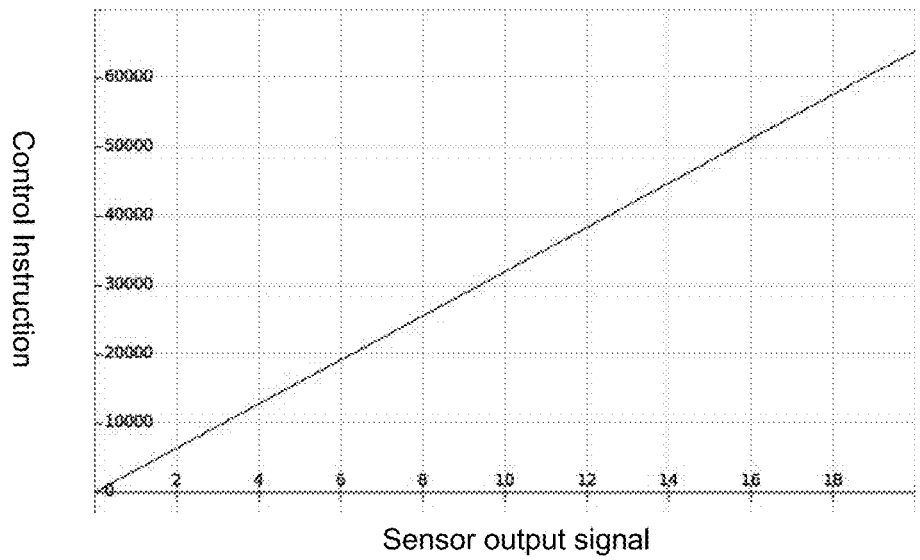
FIG. 9 shows a plot of a linear function of sensor output signal vs. control instruction in accordance with the disclosure.

FIG. 8—Description of Additional Embodiment

FIG. 8 shows an additional embodiment similar to the embodiment of FIG. 7, however the touchless sensor is a distance sensor 599. Non-limiting choices for a distance sensor 599 include an ultrasonic reflection sensor, a infrared light reflection sensor, a capacitive sensor, a Theremin, or a composite sensor comprised of one or more of these operating in concert. A composite sensor may be advantageous by enabling measurements that exceed the abilities of a single sensor.

The distance sensor 599 emits a touchless sensor output signal 601. The touchless sensor output 601 is connected to the microcontroller board 300.

The distance sensor 599 emits a touchless sensor output signal 601 expressing values in a predetermined range. These values are captured by the microcontroller board 300 and similarly used to calculate a control instruction which is then used to drive the power control signal 390.

Thus the reader will see that the disclosed signal modifiers provide a plurality of new signal processing options both to owners of signal processing circuits, and to manufacturers of signal processing circuits looking to incorporate this functionality into their own products.

The disclosed embodiments that incorporate human body motion are advantageous in that the artistic community that laments the decline or loss of physical controllers, such as faders, knobs, and buttons, will have another physical interface for creative expression. Having the ability to manipulate a signal processing circuit without touching it is advantageous, particularly for live performance applications, where the instrumentalist need not remove a hand from their instrument in order to manipulate the signal processing circuit.

While my above description contains many specificities, these should not be construed as limitations on the scope, but rather as an exemplification of one [or several] embodiments thereof. Many other variations are possible.

Accordingly, the scope should be determined not by the embodiments illustrated, but by the appended claims and their legal equivalents.

DRAWINGS—REFERENCE NUMERALS 110 power source
120 enclosure
130 antenna
131 minimum antenna
150 power output
151 modified output power
152 ⅛ inch tip/sleeve male terminated power output cable
153 male barrel connector terminated power output cable
160 signal processing circuit power input cable
161 second power input connection
170 audio-visual signal processing circuit
180 unprocessed input signal
181 audio-visual input device
190 processed output signal
193 output signal connection
200 first input controller
201 first input controller signal output
210 second input controller
211 second input controller signal output
220 third input controller
221 third input controller signal output
230 fourth input controller
231 fourth input controller signal output
240 switch
251 communication connection
241 switch signal output
300 microcontroller board
300a processor
300b memory
300c transmitting/receiving port
302 user interface
350 power input
351 first power input connection
380 adjustable wired antenna stand 390 power control signal
391 control signal input
400 power controller
480 antenna enclosure connection
481 internal antenna connection
590 human
591 audio-visual input device
592 audio-visual output device
594 potentiometer
595 resistive control signal
596 capacitive control signal
597 varactor diode
598 digital potentiometer
599 touchless sensor
601 touchless sensor output signal

I claim:

1. A signal processing system comprising:
 a) an audio-visual signal processing circuit for modifying a signal from an audio-visual input device to an audio-visual output device;
 b) a touchless sensor emitting a touchless sensor output signal in response to the proximity of an object to the touchless sensor;
 c) a power input for receiving power from a power source;
 d) a power output for sending a modified output power to the audio-visual signal processing circuit; and
 e) a processor for converting the power received at the power input to the modified output power as a function of the touchless sensor output signal.

2. The signal processing system of claim 1, wherein the processor includes one or more conversion algorithms and wherein the system includes an input for selecting or modifying the one or more conversion algorithms.

3. The signal processing system of claim 1 wherein the processor includes one or more preset parameters and wherein the system includes an input for selecting or modifying the one or more preset parameters.

4. The signal processing system of claim 1 wherein the system includes one or more information outputs and wherein the system includes an input for selecting or modifying the one or more information outputs.

5. The signal processing system of claim 1 wherein the touchless sensor includes a Theremin.

6. The signal processing system of claim 1 wherein the touchless sensor includes a distance sensor.

7. The signal processing system of claim 1 wherein the touchless sensor includes a capacitive sensor.

8. A machine for dynamically varying the amount of power supplied to an audio-visual signal processing circuit, the machine comprising:
 a) a touchless sensor emitting a touchless sensor output signal in response to the proximity of an object to the touchless sensor;
 b) a power input for receiving power from a power source;
 c) a power output for sending a modified output power to the audio-visual signal processing circuit; and
 d) a processor for converting the power received at the power input to the modified output power as a function of the touchless sensor output signal.

9. The machine of claim 8 wherein the processor includes one or more conversion algorithms and wherein the system includes an input for selecting or modifying the one or more conversion algorithms.

10. The machine of claim 8 wherein the processor includes one or more preset parameters and wherein the system includes an input for selecting or modifying the one or more preset parameters.

11. The machine of claim 8 wherein the machine includes one or more information outputs and wherein the machine includes an input for selecting or modifying the one or more information outputs.

12. The machine of claim 8 wherein the touchless sensor includes a Theremin.

13. The machine of claim 8 wherein the touchless sensor includes a distance sensor.

14. The machine of claim 8 wherein the touchless sensor includes a capacitive sensor.

15. A method for modifying a signal from an audio-visual input device to an audio-visual output or capture device, the method comprising:
 a) receiving an input signal from a touchless sensor;
 b) modifying an input power to a modified output power based on the input signal from the touchless sensor;
 c) sending the modified output power to an audio-visual signal processing circuit; and
 d) sending an audio-visual output signal to the audio-visual output or capture device as a function of the modified output power.

16. The method of claim 15 wherein the touchless sensor includes a Theremin.

17. The method of claim 15 wherein the touchless sensor includes a distance sensor.

18. The method of claim 15 wherein the touchless sensor includes a capacitive sensor.

* * * * *